United States Patent

Waskiewicz

[11] Patent Number: 5,131,762
[45] Date of Patent: Jul. 21, 1992

[54] HIGH PERFORMANCE TWO-PIECE BEARING CAGE

[75] Inventor: Walter P. Waskiewicz, Bristol, Conn.

[73] Assignee: The Torrington Company, Torrington, Conn.

[21] Appl. No.: 724,814

[22] Filed: Jul. 2, 1991

[51] Int. Cl.⁵ ............................................. F16C 33/38
[52] U.S. Cl. .................................... 384/448; 384/526
[58] Field of Search ............... 384/448, 526, 531, 530, 384/527, 523

[56] References Cited

U.S. PATENT DOCUMENTS

| | | | |
|---|---|---|---|
| 4,451,098 | 5/1984 | Farley et al. | 384/526 |
| 4,732,496 | 3/1988 | Shail | 384/526 |
| 4,941,759 | 7/1990 | Dreschmann et al. | 384/531 |
| 5,035,520 | 7/1991 | Valette | 384/531 |

*Primary Examiner*—Lenard A. Footland
*Attorney, Agent, or Firm*—John C. Bigler

[57] ABSTRACT

A high performance, two-piece cage for a ball bearing assembly includes a first annular member having a plurality of pockets and a second annular member that serves as a retaining ring to retain the balls in the first annular member. The pockets of the first annular member enclose an arc slightly greater than 180 degrees of each ball. Recesses in the second annular member, corresponding to the pockets of the first annular member, make point contact with the balls to urge the balls into position in the pockets. The limited arc of the pockets allows the first annular member to be removed from its mold, even when made of a brittle high temperature material. Second annular member can be made from a material different from that of the first annular member and can be made radially thinner than the first annular member to facilitate visual inflection of the ball bearing assembly.

19 Claims, 2 Drawing Sheets

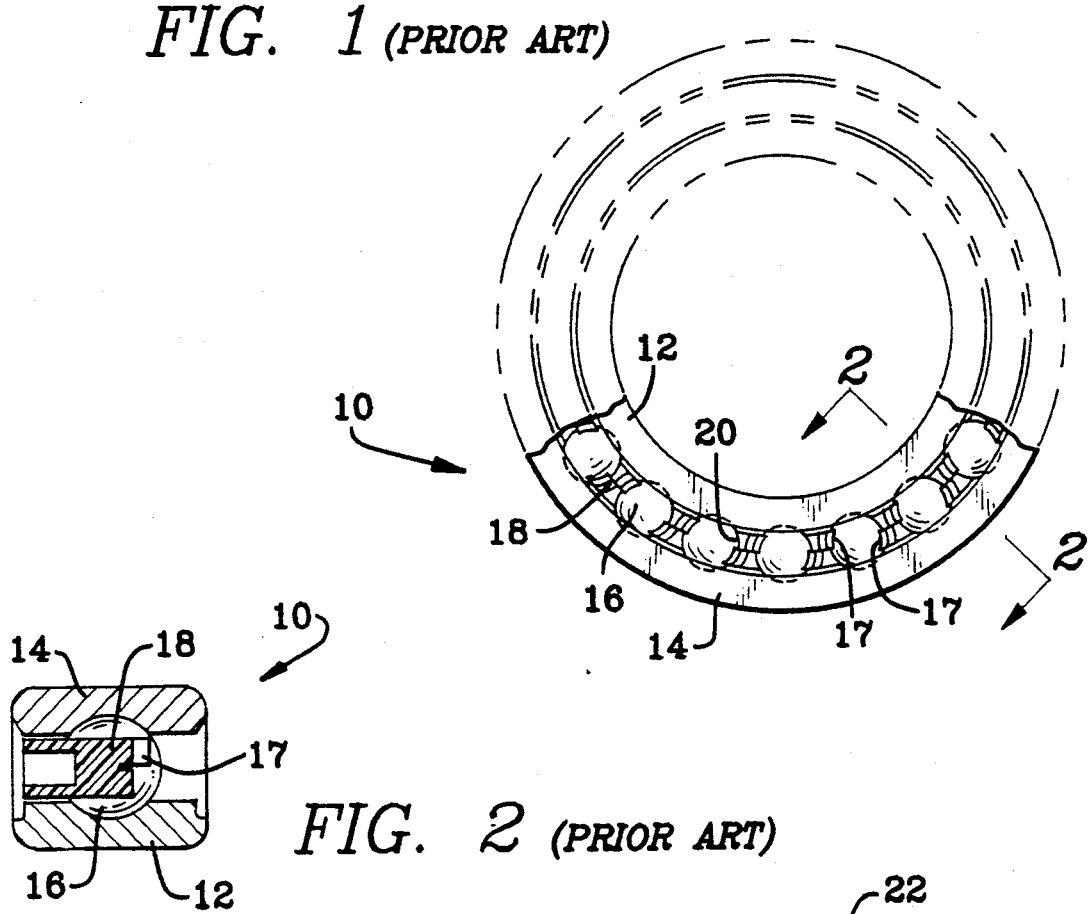
FIG. 1 (PRIOR ART)
FIG. 2 (PRIOR ART)
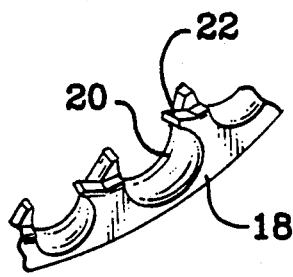
FIG. 3 (PRIOR ART)
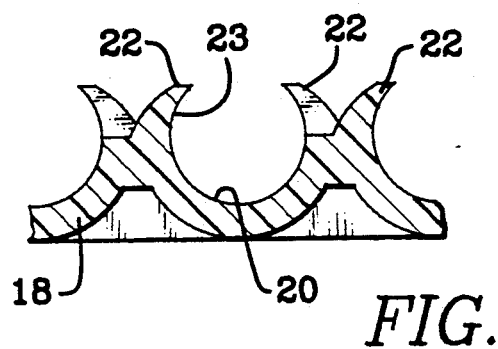
FIG. 4 (PRIOR ART)

HIGH PERFORMANCE TWO-PIECE BEARING CAGE

BACKGROUND OF THE INVENTION

This invention relates generally to a bearing cage for retaining balls of a ball bearing assembly in correct tangential position and, more particularly, to a two-piece bearing cage that may be molded of plastic or other material.

The use of bearing cages to maintain balls in their correct relative positions in a bearing assembly is well known. Typically, these bearing cages are injection molded of polyamide or filled polyamide resins. These cages are generally both functional and cost effective. However, a major problem associated with these cages is that their use in high temperature applications is restricted by upper temperature operating limits of 250 to 300 degrees Fahrenheit.

Bearing cages used in higher temperature applications are generally made of metal. These cages, which may be one or two-piece designs, are made of stamped or machined steel or the like. In the case of two-piece designs, the parts may be joined by welding, riveting or mechanical interlock. Some disadvantages of metal cages are that they are expensive, difficult to assemble and to visually inspect, and noisy in operation. Other problems include poor lubrication and inadequate heat dissipation.

High temperature polymers, such as polyetherketone (PEK) or polyetheretherketone (PEEK), capable of operating at temperatures up to 600 degrees Fahrenheit, are available. However, these high temperature polymers are brittle, having a much higher modulus of elasticity than more traditional types of plastic resin. In current designs, cages are molded with fingers or tabs projecting from them to hold bearing balls in position. When cages are made of high temperature polymers, such fingers or tabs fracture under the deflection required to remove the cages from their molds or to assemble the ball bearing assemblies.

The foregoing illustrates limitations known to exist in present bearing cages. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a high performance two-piece bearing cage for a ball bearing assembly. The two-piece cage has a first annular member having a plurality of pockets evenly spaced along the circumference thereof for holding a plurality of balls in relative position, one to the other. Each of the pockets is shaped to accommodate one of the balls and encloses an arc limited to slightly more than 180 degrees of each ball. The two-piece cage also includes a second annular member configured to make a point contact with each of the balls such that the balls are retained in the pockets of the first annular member. The first annular member is joined to the second annular member.

In another aspect of the present invention, the second annular member is thinner radially relative to the axis of the first annular member than the first annular member. The thinner second annular member allows visual inspection of the ball bearing assembly.

The above, and other features and advantages of the present invention will become apparent from the following description read in conjunction with the accompanying drawings, in which like reference numerals designate the same elements.

BRIEF DESCRIPTION OF THE DRAWING FIGURES

FIG. 1 is a partially cutaway side view of a bearing cage and ball bearing assembly of the prior art;

FIG. 2 is a cross-sectional view of the ball bearing assembly of FIG. 1 taken at line 2;

FIG. 3 is an oblique view illustrating an embodiment of a portion of the cage of the ball bearing assembly of FIG. 1;

FIG. 4 is a longitudinal sectional view of a portion of the cage of FIG. 3;

DETAILED DESCRIPTION

Figure 5:
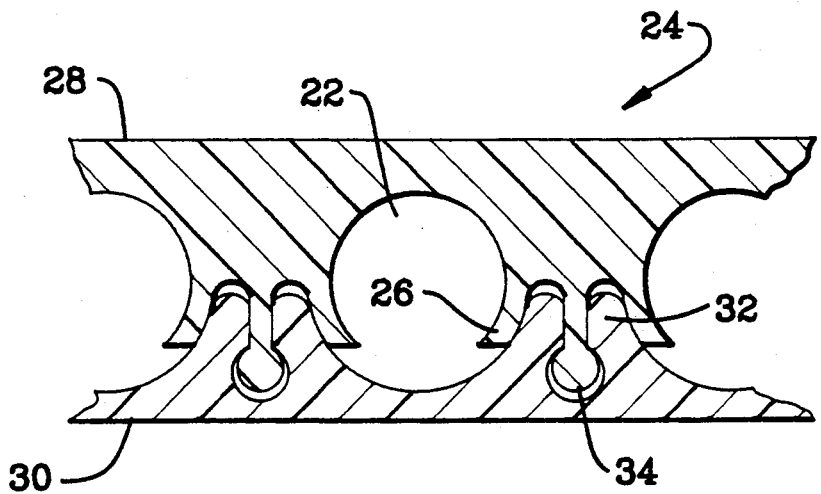
FIG. 5 is a longitudinal sectional view of a two-piece cage of the prior art having a backup ring and wedges to reinforce pocket fingers.

Referring to Figure a prior art ball bearing assembly 10 comprises annular inner and outer races 12 and 14 and a plurality of evenly spaced balls 16 within raceways 17 of inner and outer races 12 and 14. An annular cage 18, having a plurality of evenly spaced pockets 20, is positioned between inner and outer races 12 and 14, as shown in FIG. 2.

Referring now to FIGS. 3 and 4, cage 18 may be formed with fingers or tabs 22 that extend walls 23 of pockets 20 significantly beyond 180 degrees of arc of balls 16 (FIG. 1) to allow cage 18 to retain balls 16 in their correct relative positions. As can be seen in the figures, the thickness of fingers 22 is considerably less than the main area of cage 18. This increases the flexibility of fingers 22 and permits their deflection during removal from a mold or during assembly.

Flexibility of fingers 22 is adequate for cages 18 that are made of polyamide resins for use in moderate temperature applications. However, when cages 18 are made of high temperature plastics, such as polyetherketone (PEK) or polyetheretherketone (PEEK), fingers 22 tend to fracture as they are deflected during removal from molds when being manufactured or when being assembled into bearing assemblies. This is due to the high modulus of elasticity of these high temperature plastics. As a result, these plastics cannot be used with such prior art designs.

While molds can be designed to minimize the danger of fracturing fingers 22, the cost of such molds makes this solution undesirable.

Referring to FIG. 5, a prior art two-piece cage 24 is shown, wherein fingers 26 of annular member 28 are reinforced by a backup ring 30. Wedges 32, formed in backup ring 30, are forced between snaps 34 and fingers 26 to hold fingers 26 rigidly in place. Snaps 34 fasten backup ring 30 to annular member 28 to form two-piece cage 24.

Figure 6:
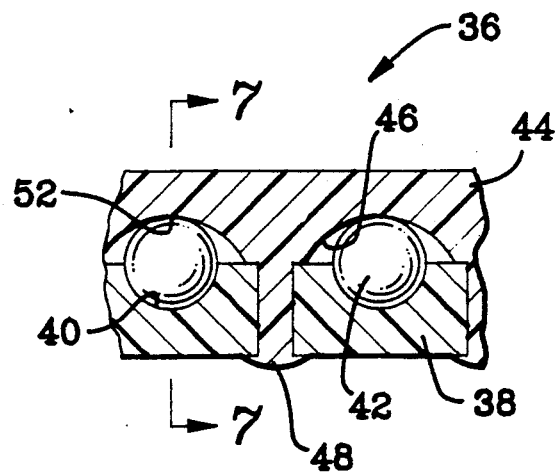
FIG. 6 is a longitudinal sectional view of a portion of the two-piece cage of the present invention having vaulted recesses in a retaining ring.

Referring to FIG. 6, a two-piece cage 36 of the present invention is made of a high performance plastic, for example, such as PEK or PEEK. Two-piece cage 36 includes a first annular member 38, having along one side a plurality of pockets 40 evenly spaced along the circumference thereof for holding balls 42 in their correct relative positions.

Each of pockets 40 is spherically concave, enclosing an arc only slightly more than 180 degrees of balls 42. By thus limiting the arc of pockets 40, it is possible to remove first annular member 38 from its mold without having to deflect or otherwise stress any portion, in contrast to fingers 22 of the prior art (FIGS. 3 through 5). As a result, the problem of fracturing during manufacture is avoided. Additionally, this shape of pockets 40 avoids the problem of fracturing of first annular member 38 when balls 42 are inserted into pockets 40.

Figure 8:
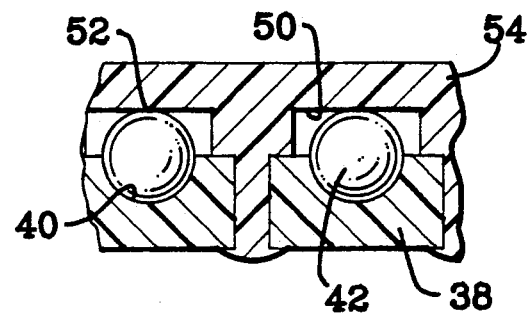
FIG. 8 is a longitudinal sectional view of a portion of the two-piece cage of the present invention having a flat roof in the recesses of a retaining ring.

A second annular member 44 having a plurality of recesses 46 that correspond to pockets 40 is attached to cage 38 by a plurality of fasteners 48. Second annular member 44 may be characterized as a retaining ring and serves to prevent balls 42 from moving out of their respective pockets 40 in first annular member 38. The shape of recesses 46 may be vaulted with an arched roof configuration as shown in FIG. 6, for example, or rectangular, with a flat roof configuration, as recesses 50 in FIG. 8.

Such shapes of recesses 46 and 50 provide only point contact, at a single contact point 52, with balls 42. Thus, second annular member 54 contributes a minimum of friction. In addition, the spaces between recesses 50 and rotating balls 42 permit improved access of lubricant to rotating balls 42.

In the present invention, first annular member 38 assumes substantially all of the burden of keeping balls 42 in their proper positions. Second annular member 44 or 54 merely maintains balls 42 in pockets 40 and is only lightly loaded.

Figure 7:
FIG. 7 is a cross sectional view of the two-piece cage of FIG. 6 taken at line 7.

Referring to FIG. 7, it can be seen that second annular member 44 or 54 is considerably thinner radially relative to the axis of the first annular member than first annular member 38. This is possible because of the minimal stress placed upon second annular member 44 or 54 in these embodiments. The thinness of second annular member 44 or 54 permits visual inspection of the ball bearing assembly.

Preferably, contact point 52 is on a centerline of each ball 42 parallel to the axis of the first annular member 38. This configuration directs the retaining force parallel to that axis. However, second annular member 44 may be configured with contact point 52 at other locations and still provide the desired retention of balls 42 within pockets 40.

Second annular member 44 or 54 may be made from the same material as first annular member 38, or may be made from a different material from that of first annular member 38, depending on the specific application. For example, with first annular member 38 made of PEK or PEEK, second annular member 44 or 54 may be made of a polymer having distinctly different properties, or it may be made of stamped, machined or powdered metal. A lubricant-impregnated sintered bronze may be used. (Oilite bearings are a well-known example of such lubricating metal.) Similarly, a lubricating type plastic may be used such as, for example, tetrafluoroethylene (TFE), polytetrafluoroethylene (PTFE) or polyphthalamide (PPA).

Second annular member 44 or 54 may be joined to first annular member 38 by any suitable means. Besides fasteners 48, such means may include, but are not limited to, snap fits, ultrasonic welding, crimping, and adhesive bonding.

Advantages of the present invention include the following:

First annular member 38 and second annular member 44 or 54 are shaped such that no flexibility is needed for removal from molds;

The two-piece cage can be molded of high modulus of elasticity materials with reduced probability of fracture;

Second annular member 44 or 54 may be made of a material, selected for its special properties for a particular application and may differ from the material of first annular member 38. Such special properties may include, for example, lubrication or heat dissipation;

Improved visual inspection of a bearing assembly is allowed because of the thinness of second annular member 44 or 54; and Positive ball retention is accomplished by the joining together of first and second annular members.

Having described the invention, what is claimed is:

1. A two-piece cage for a ball bearing assembly comprising:
   a first annular member for holding a plurality of balls in relative position, one to the other, said first annular member having a plurality of pockets evenly spaced along the circumference thereof for holding the balls, each of said pockets shaped to accommodate one of the balls, and enclosing an arc limited to slightly more than 180 degrees of each ball;
   a second annular member configured to make a point contact with each of the balls such that the balls are retained in said pockets; and
   means for joining said first annular member to said second annular member.

2. The two-piece cage for a ball bearing assembly according to claim 1, wherein said second annular member provides a plurality of recesses corresponding to said pockets, said recesses having an arched roof configuration to make said point contact with the balls.

3. The two-piece cage for a ball bearing assembly according to claim wherein said second annular member provides a plurality of recesses corresponding to said pockets, said recesses having a substantially flat roof configuration to make said point contact with the balls.

4. The two-piece cage for a ball bearing assembly according to claim 1, wherein said first annular member is formed of a suitable high temperature, high modulus of elasticity material in a mold, said first annular member being shaped for removal from said mold without significant deflection.

5. The two-piece cage for a ball bearing assembly according to claim 1, wherein said second annular member is thinner radially relative to said axis than said first annular member such that said second annular member permits visual inspection of said ball bearing assembly.

6. The two-piece cage for a ball bearing assembly according to claim 1, wherein said second annular member is formed of a material similar to the material of said first annular member.

7. The two-piece cage for a ball bearing assembly according to claim 1, wherein said second annular member is formed of a material dissimilar to the material of said first annular member.

8. The two-piece cage for a ball bearing assembly according to claim 7, wherein said second annular member is molded of a polymer that is different from a polymer forming said first annular member.

9. The two-piece cage for a ball bearing assembly according to claim 7, wherein said second annular member is made of metal.

10. The two-piece cage for a ball bearing assembly according to claim 7, wherein said second annular member is made of a porous metal containing a lubricant.

11. The two-piece cage for a ball bearing assembly according to claim 1, wherein said point contact is on a centerline of each ball parallel to the axis of the first annular member.

12. A two-piece cage for a ball bearing assembly comprising:
   a first annular member for holding a plurality of balls in relative position, one to the other, said first annular member having an axis and a plurality of pockets evenly spaced along the circumference thereof for holding the balls, each of said pockets shaped to accommodate one of the balls and enclosing an arc limited to slightly more than 180 degrees of each ball;
   a second annular member making contact with the balls such that the balls are retained in said pockets, said second annular member being thinner radially relative to said axis than said first annular member such that said second annular member permits visual inspection of said ball bearing assembly.

13. The two-piece cage for a ball bearing assembly according to claim 12, wherein said first annular member is formed of a suitable high temperature, high modulus of elasticity material in a mold, said first annular member being shaped for removal from said mold without significant deflection.

14. The two-piece cage for a ball bearing assembly according to claim 12, wherein said second annular member is formed of a material similar to the material of said first annular member.

15. The two-piece cage for a ball bearing assembly according to claim 12, wherein said second annular member is formed of a material dissimilar to the material of said first annular member.

16. The two-piece cage for a ball bearing assembly according to claim 15, wherein said second annular member is molded of a polymer that is different from a polymer forming said first annular member.

17. The two-piece cage for a ball bearing assembly according to claim 15, wherein said second annular member is made of metal.

18. The two-piece cage for a ball bearing assembly according to claim 15, wherein said second annular member is made of a porous metal containing a lubricant.

19. The two-piece cage for a ball bearing assembly according to claim 12, wherein said second annular member is configured to make a point contact with each of the balls such that the balls are retained in said pockets.

* * * * *